May 26, 1964  E. HALLMARKEN  3,134,259
DEW-POINT TEMPERATURE SENSITIVE DEVICE
Filed July 10, 1962
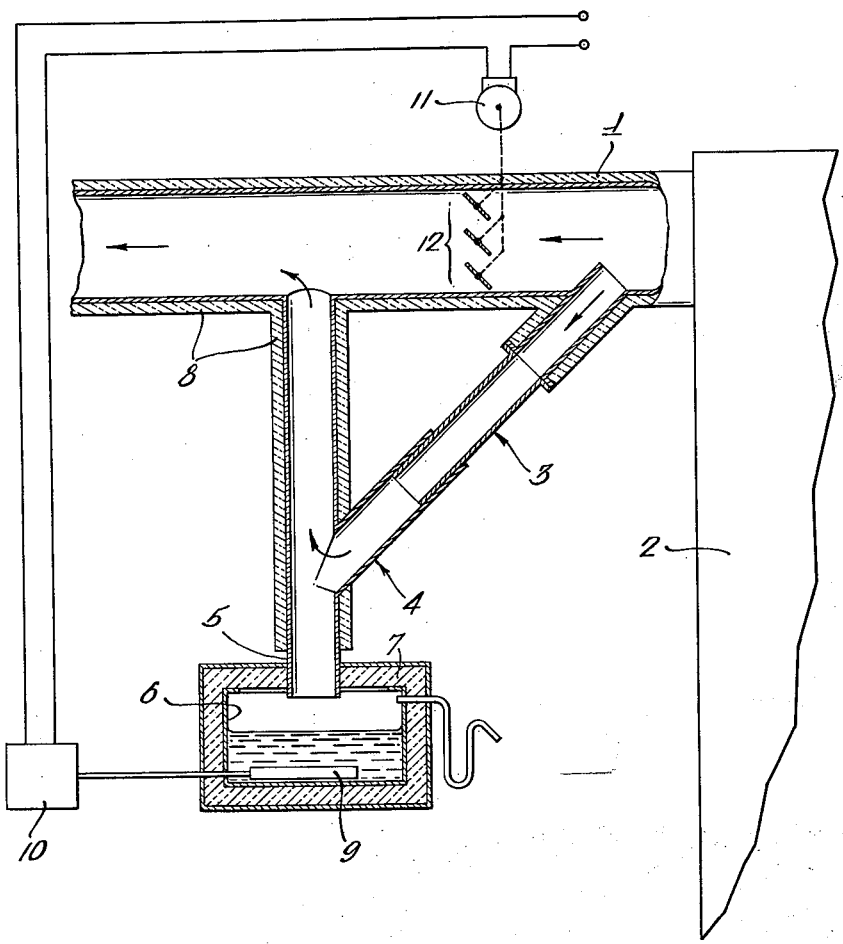
INVENTOR:
EVERT HALLMARKEN
BY
Howson & Howson
ATTYS.

United States Patent Office 3,134,259
Patented May 26, 1964

3,134,259
DEW-POINT TEMPERATURE SENSITIVE DEVICE
Evert Hallmarken, Saltsjobaden, Sweden, assignor to Aktiebolaget Svenska Fläktfabriken, Stockholm, Sweden
Filed July 10, 1962, Ser. No. 208,824
Claims priority, application Sweden July 12, 1961
6 Claims. (Cl. 73—336.5)

The present invention relates to a device for sensing the dew-point temperature of a flowing gaseous medium consisting of a by-pass connected to a duct for said medium.

For the governing of many types of technical processes, i.e. the drying or the conditioning of hygroscopic substances, there is often a need to measure and control the moisture or the vapor pressure of the air in the treatment apparatus or locality. Such measurements have previously usually been made according to the psychometric method, i.e. by measuring by means of a dry and a wet thermometer. As the temperature of the air in such plants often is relatively high and as the air furthermore is commingled with fibres, resins or other substances, the measurement with the wet thermometer will in many cases give incorrect values owing to the fact that the covering arranged around the thermometer bulb is destroyed or cannot be kept wet. Furthermore, the use of two measuring values causes a complication of the necessary governing automatic means.

The invention, the object of which is to eliminate said drawbacks and difficulties and which is based upon the technical fact that the dew-point temperature of the air alone gives a correct value of the humidity of the air, relates to a measurement of the dew-point temperature by means of a simple device and utilizes the sensed values as an impulse for a desired automatic control. The device according to the invention, which, as stated above, consists of a by-pass connected to a duct for said medium, is characterized in that the by-pass consists of an angled pipe of a material with good heat conductivity, which pipe at its angle-point is provided with a vertical downwardly projecting branch pipe, the free end of which is connected to a liquid container enclosed in a heat insulating cover and in that the temperature-sensitive element is arranged in said liquid container close to its bottom in order to be subjected to the influence of the condensate deposited from said medium.

The temperature sensitive element suitably consists of the sensitive body (the bulb) of a distant thermometer or a distant thermostat but may also, according to a suitable embodiment of the invention, consist of an (electrical) resistance connected to a resistance bridge (Wheatstone bridge) of known design and coupled to an amplifier, a relay, or the like.

For making possible an adjustment of the condensing surface with respect to the prevailing temperature differences, the inlet branch of the angled pipe is suitably constructed as a telescope pipe.

The invention will now be described in more detail with reference to the accompanying drawing showing an exemplary embodiment of a device made according to the invention.

In the drawing 1 designates a duct for a flowing gaseous medium which, in the case shown, consists of ventilating air being discharged from a drying plant 2. To said duct there is connected a by-pass 3 which includes an angled pipe 4 made of a material having good heat conductivity. Said pipe is at its angle-point connected to a vertical downwardly projecting branch pipe 5, the free end of which is connected to a liquid container 6 enclosed in a heat insulating cover 7. Whereas on the duct 1 and the pipe 5 an outer insulation 8 is generally arranged, the inlet angled pipe 4 is entirely uninsulated, with the result that the air passing through the pipe 4 will be cooled and part of its water contents condensed on the pipe wall. Owing to the slanting disposition of the inlet branch the condensate will rapidly flow down into the container 6 without changing its temperature so that it will be the same as during its deposit, i.e., the dew-point temperature; and the condensate in the container will register the dew-point on a temperature sensitive element 9 arranged at the bottom of the container. In the case shown, the element 9 consists of the sensitive body of a distant thermostat 10. In the embodiment shown, this thermostat guides a control motor 11 for operating dampers 12 arranged in the duct 1, by means of which the discharged quantity of the ventilation air and thus the condition of the air inside the drying plant 2 can be governed. The device will function in the following manner:

When air is sucked through the by-pass pipe 3 part of the water content of the air will condense on the pipe walls as the temperature of air surrounding said pipe is considerably lower than the temperature of the air within the pipe. Owing to the steep slant of the branch pipe, the condensate will rapidly flow down into the insulating container. The temperature of the condensate will then be very near the dew-point temperature of the air.

Without departing from the idea of the invention, the element 9 may, instead of the above described embodiment, consist of an electrical resistance connected to a resistance bridge (Wheatstone bridge) of an amplifier or a relay which in such a case substitutes for the thermostat 10 as the governing means for the illustrated regulating device or any other suitable equipment.

What I claim is:
1. A device for sensing the dew-point temperature of a flowing gaseous medium consisting of a by-pass connected to a duct for said medium and equipped with a temperature-sensitive element, characterized in that the by-pass consists of an angled pipe of a material with good heat conductivity, which pipe at its angle point is provided with a vertical downwardly projecting branch-pipe, the free end of which is connected to a liquid container enclosed in a heat insulating cover, and that the temperature-sensitive element is arranged in said liquid container close to its bottom in order to be subjected to the influence of the condensate deposited from said medium.

2. A device according to claim 1, characterized in that the temperature-sensitive element consists of the sensitive body of a distant temperature responsive control device.

3. A device according to claim 1, characterized in that the temperature-sensitive element consists of an electrical resistance connected to a Wheatstone bridge of known design and coupled to a suitable control device.

4. A device according to claim 1, characterized in that the inlet branch of the angled pipe is constructed as a telescope pipe for making possible an adjustment of a suitable condensing surface area with respect to the prevailing temperature differences.

5. A device for sensing the dew-point temperature of a flowing gaseous medium, comprising in combination, a main insulated conduit through which the gaseous medium flows, a flow control device in said conduit, by-pass conduit means connected to said conduit around said control device, said by-pass conduit means including an intake duct connected to said main conduit upstream of said control device, said intake duct having a steep slope and having metallic portions exposed to the surrounding atmosphere, an insulated container into which the condensate from said intake duct empties, said by-pass conduit means also including an insulated outflow duct from said receptacle to the main conduit downstream of said control device, and means responsive to the temperature of condensate in said receptacle for controlling the action of said flow control device.

6. A device according to claim 5, which further includes means for adjusting the amount of surface exposure of said intake duct.

References Cited in the file of this patent
UNITED STATES PATENTS

| | | |
|---|---|---|
| 2,270,111 | Daley | Jan. 13, 1942 |
| 2,311,661 | Howe | Feb. 23, 1943 |
| 2,920,398 | Liljenstrom | Jan. 12, 1960 |